J. F. SCHMELTZER & J. M. ROBERTS.
Instruments to Loosen Dried Fruits.

No. 144,147. Patented Oct. 28, 1873.

Witnesses
E. A. Bates,
George E. Upham,

Inventors.
J. F. Schmeltzer,
J. M. Roberts,
Chipman Hosmer & Co
Attys

UNITED STATES PATENT OFFICE.

JOHN F. SCHMELTZER AND JOSEPH M. ROBERTS, OF WINONA, MINNESOTA.

IMPROVEMENT IN INSTRUMENTS TO LOOSEN DRIED FRUITS.

Specification forming part of Letters Patent No. 144,147, dated October 28, 1873; application filed May 3, 1873.

*To all whom it may concern:*

Be it known that we, JOHN F. SCHMELTZER and JOSEPH M. ROBERTS, of Winona, in the county of Winona and State of Minnesota, have invented a new and valuable Improvement in an Instrument to Loosen Dried Fruits; and we do hereby declare that the following is a full, clear, and exact description of the construction and operation of the same, reference being had to the annexed drawings, making a part of this specification, and to the letters and figures of reference marked thereon.

Figure 1:
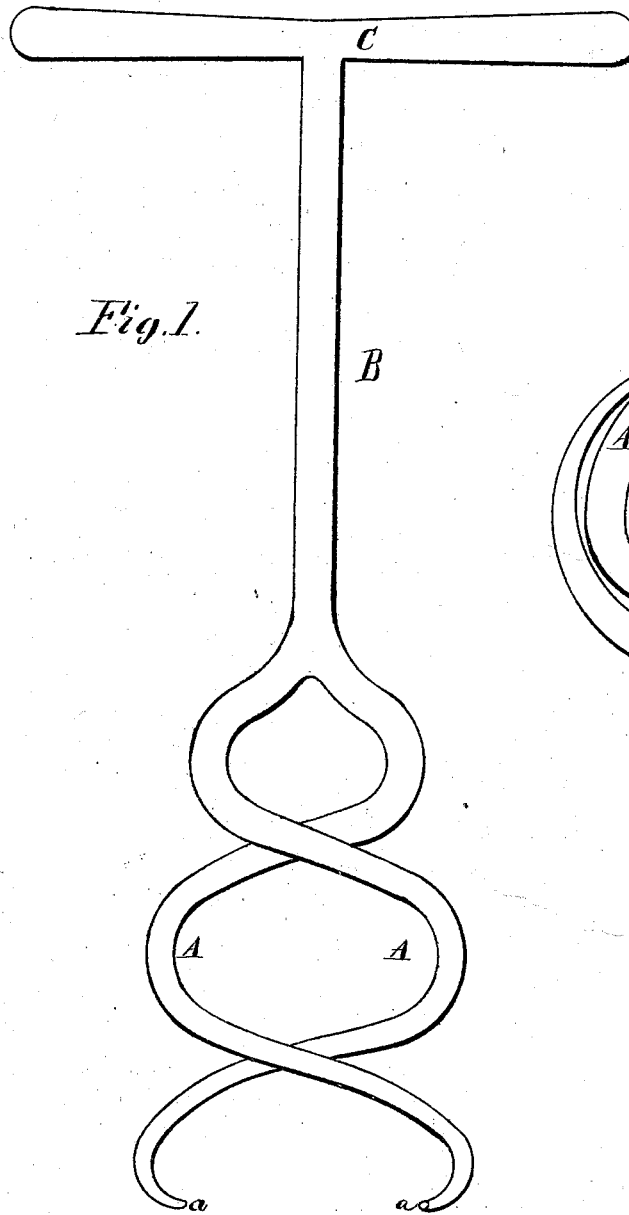
Figure 2:
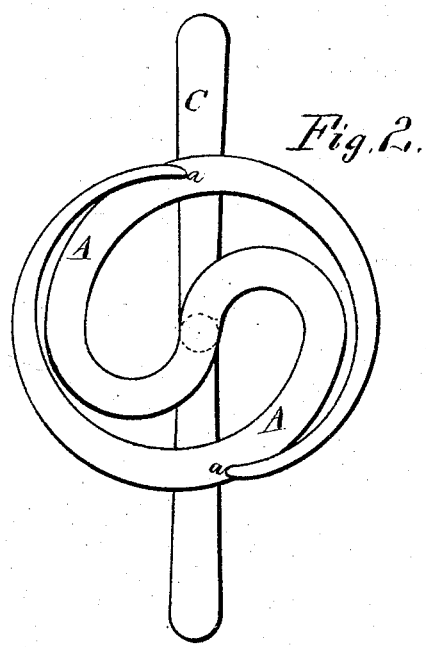

Figure 1 of the drawings is a representation of our screw for lifting dried fruit by a front elevation. Fig. 2 is a plan view of the same.

Our invention has relation to means for lifting dried and packed fruit out of boxes and barrels, thereby facilitating the loosening and dealing out of such fruit, and avoiding the necessity of breaking the box or barrel from around the fruit, which is of frequent occurrence. The invention consists in the construction of a novel instrument, having two opposite spiral prongs turning the same direction, and tapering in form to their points, and united at their upper ends into a shank, as hereinafter more fully described.

In the accompanying drawings, the letters A A designate spiral prongs, tapering gradually to their pointed ends, and united at their roots into a shank, B. The diameter of the spiral curve of each branch is greatest at the points, and gradually becomes less toward the shank. When the instrument is twisted into the fruit this formation serves to wedge the latter into the cavity within the prongs, and in this manner to loosen or separate it from the surrounding mass, so that the fruit grasped can be readily lifted. In order that the force may be conveniently applied, a strong cross-head, C, or handle, is formed on the shank.

What we claim as new, and desire to secure by Letters Patent, is—

The fruit-loosening instrument, consisting of two opposite spiral prongs turning in the same direction, and gradually expanding to encompass a cone-shaped space, said prongs being tapering in form to their points, and united at their upper ends into a shank having a cross-head, substantially as shown and described.

In testimony that we claim the above we have hereunto subscribed our names in the presence of two witnesses.

J. F. SCHMELTZER.
J. M. ROBERTS.

Witnesses:
C. J. MAYBURY,
WM. S. DREW.